(No Model.)
C. HERING.
ELECTRIC REGULATOR FOR CONSTANT POTENTIAL.
No. 454,475.　　　　　　　Patented June 23, 1891.
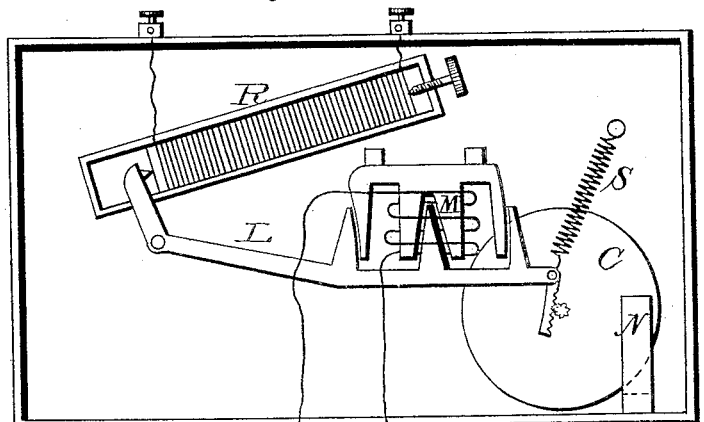
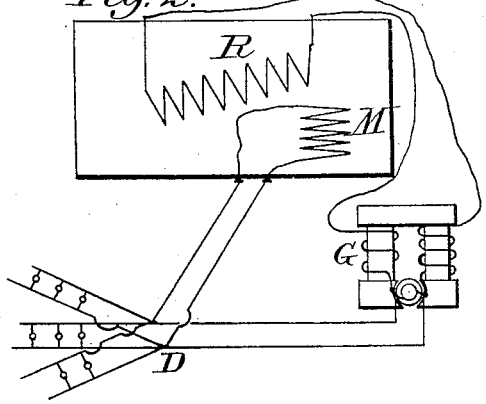
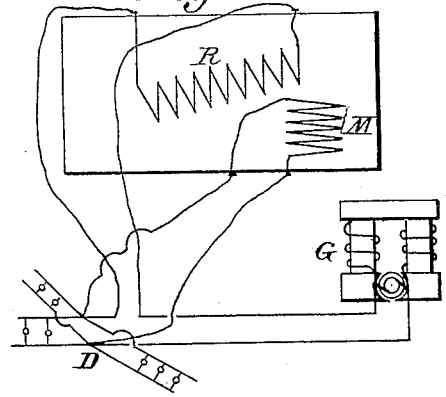
Witnesses
Hermann S. Hering
John Hoskin
Inventor
Carl Hering

UNITED STATES PATENT OFFICE.

CARL HERING, OF PHILADELPHIA, PENNSYLVANIA, ASSIGNOR OF ONE-HALF TO JOHN HOSKIN, OF SAME PLACE.

ELECTRIC REGULATOR FOR CONSTANT POTENTIAL.

SPECIFICATION forming part of Letters Patent No. 454,475, dated June 23, 1891.

Application filed December 16, 1887. Serial No. 258,127. (No model.)

*To all whom it may concern:*

Be it known that I, CARL HERING, a citizen of the United States, residing in the city of Philadelphia, in the county of Philadelphia and State of Pennsylvania, have invented a new and useful Electrical Regulator for Constant Potential, of which the following is a full, clear, and exact description.

My invention relates to an apparatus for automatically maintaining the difference of potential in a circuit constant. It is well known that the difference of potential of a dynamo or at the poles of incandescent lamps supplied by a dynamo is dependent on a number of factors, some or all of which it is difficult, if not in many cases impossible, to maintain constant. This difference of potential will therefore vary accordingly. Among these factors are the speed of the dynamo, the heating of the armature, the variable amounts of current, the resistance of the leads, the position of the brushes, and in shunt or compound wound machines the heating of the shunt field-magnet coils.

The object of my invention is to automatically compensate for the effects of such irregularities on the difference of potential, whether the irregularities are due to any one, several, or all of these inconstant factors, and thereby maintain the difference of potential constant.

My invention consists, essentially, of a detector and an adjustable resistance. The object of the former is to detect any changes, and when they exist to adjust the resistance. This resistance is so connected with the circuit or the machine that it will control the difference of potential at the points where it is to be kept constant.

The general arrangements of the parts is shown in Figures 1, 2, and 3. Fig. 1 shows the detector M, the resistance R, and the lever L for actuating the same. Figs. 2 and 3 show several methods of connecting the same in circuit.

Referring to Fig. 1, M is the detector, which may be any convenient electro-motive device, which is actuated by a fine wire coil whose terminals are connected to the two points at which the potential is to be kept constant. I prefer to use the long-pull magnet described in my application, Serial No. 213,481, which consists, essentially, of a coil and two masses of iron, one fixed and the other movable, the masses of iron having their active surfaces inclined to the direction of motion of the movable part. The movable part of this detector is connected to the lever L, by which its motion is transferred to the adjustable resistance R. I prefer to use a pile of carbons or other disks whose resistance varies with the pressure exerted on the same.

The action of the regulator is as follows: The detector-magnet M being connected to the two points at which the difference of potential is to be kept constant, will vary in strength if the potential varies. If the potential grows less, the armature will descend. This will cause the end of the lever to exert a greater pressure on the pile of carbons R, thus diminishing its resistance. In the same way if the potential increases the resistance will be increased. An adjustable spring S may be used to act in conjunction with the magnet. A damper C N may be attached to the moving part to prevent too rapid motion. The special form of damper shown here will be described hereinafter.

The apparatus may be connected into the circuits of a shunt-wound machine, as shown in Fig. 2. G is the shunt-wound generator feeding a system of lamps from a center of distribution D. The detector-coil M is connected to these points D where the potential is to be kept constant. The resistance R is placed in the shunt-magnet circuit. Should the potential at D rise or fall, the detector will increase or decrease the resistance R, which in turn will vary the field-current accordingly, which will again adjust the potential. I prefer to connect the coil M to the center of distribution, in order that it may correct for variable losses of potential in the leads, but it is evident that it may also be attached to the poles of the dynamo if the leads are relatively large and short, or if it is not necessary to correct for this loss. When the changes of potential are so rapid that the magnetism of the field-magnet does not respond quickly enough on changes of the resistance R or when the generator is a battery, I may connect this resistance directly in the main circuit, as shown in Fig. 3. This is especially applicable to lighting from storage-batteries or to dynamos driven by gas-engines or other engines whose speed pulsates rapidly. The result will evidently be the same, except that a slightly-greater amount of power will thereby be wasted.

In order to avoid the use of a liquid in the damper, I prefer to use my electro-dynamic damper. This consists, essentially, of a disk C or other suitable metallic part, preferably of copper, which is connected to the moving part of the regulator—as, for instance, by a rack and pinion—so that a rapid motion is imparted to it when the lever L, whose motion is to be dampened, moves. Two poles of a strong U-shaped magnet are placed so that this disk moves between them. The north pole of such a magnet is shown at N, Fig. 1, the corresponding south pole being directly behind it on the other side of the disk C. When the lever L moves, the disk C will revolve rapidly between the magnet-poles and will generate electrical currents which will circulate in it and therefore retard its motion. This retarding force will be greater the greater the rapidity of the motion, it being insignificantly small for slow motion. This form of damper will therefore act similarly to an ordinary plunger-damper, in which liquids are used, and will have the advantage of not requiring any liquids, nor is it effected by dust or dirt, and therefore does not require frequent cleaning.

It is evident that the apparatus as connected in Fig. 2 or 4 is applicable to shunt compound or separately excited machines, while if connected as in Fig. 3 it is applicable to series machines as well.

Numerous forms of regulators have been devised for the same general purpose; but most, if not all, of them are dependent for their action on the opening or closing of one of the circuits in the regulator. This must necessarily cause some sparking at the contact-points, which in a short time interferes with or entirely destroys the action of the regulator. This objection is entirely overcome in my regulator, as all the circuits are continually closed.

When a pile of conducting-plates is used as the adjustable resistance, I prefer to incline the same very much as shown in Fig. 1, as I thereby obtain a much greater variation of the resistance than if the pile is vertical, besides preventing the opening of the circuit at the upper plate when the pressure is decreased too much, which has been found to be a great objection to the use of the vertical pile of carbons.

I claim—

1. In a regulator for maintaining constant the potential of a shunt-wound dynamo, the combination of a direct-acting electro-magnetic device whose current is derived from the points at which the potential is to be kept constant, and an adjustable resistance in series with the shunt-magnet coils, which is increased by greater current in the electro-magnetic device and decreased by smaller current in the electro-magnetic device, said resistance being a carbon pile consisting of plates or disks of carbon the axis of which pile is inclined between the horizontal and the perpendicular.

2. In a regulator for maintaining the potential constant, the combination of a direct-acting electro-magnetic device whose current is derived from the main circuit of a shunt-wound dynamo, and an adjustable resistance in the form of an inclined carbon pile in the shunt-circuit thereof, consisting of plates or disks of carbon, the axis of which pile is inclined between the horizontal and the perpendicular, and which is so connected to said electro-magnetic device that upon increase of current therein the compression of the pile is decreased.

3. In a regulator for maintaining constant the potential of a dynamo-electric machine, the combination of a direct-acting electro-magnetic device whose current is derived from the points at which the potential is to be kept constant, and an adjustable resistance in the form of an inclined carbon pile in series with the field-magnet coils, consisting of plates or disks of carbon, the axis of which pile is inclined between the horizontal and the perpendicular, and which is so connected to said electro-magnetic device that upon increase of current therein the compression of the pile is decreased.

4. A regulator for maintaining a constant potential, consisting, essentially, of an adjustable resistance of a pile of carbon plates in an electric circuit, in combination with a direct-acting electro-magnetic device for variably compressing the pile of carbons, said electro-magnetic device being actuated by a derived current from the generator, and said pile of carbons being set on an incline as distinguished from perpendicular and being so connected to said electro-magnetic device that upon increase of current therein the compression of the pile is decreased.

5. A constant-potential regulator consisting, essentially, of a circuit to be regulated, a derived circuit therefrom, a carbon pile in said first circuit automatically variable in resistance under pressure, and consisting of plates or disks of carbon, the axis of which pile is inclined between the horizontal and perpendicular, and an electro-magnetic device in the derived circuit adapted upon increase of current to diminish pressure upon said carbon pile, and consisting of an electro-magnet, the core and armature of which are formed of masses of iron having their active surfaces inclined to their direction of motion.

6. The combination of a carbon pile in a circuit, an electro-magnet in a derived circuit, a lever bearing upon said pile and connected to the armature of said electro-magnet, said electro-magnet having its core and armature formed of masses of iron whose active surfaces are inclined to their direction of motion and being so connected that upon increase of current through it the pressure upon the pile is diminished and upon decrease of such current the pressure is increased, and said pile consisting of plates or disks of carbon and having its axis inclined between the horizontal and perpendicular.

7. A resistance-pile consisting of plates or disks of carbon, the axis of which pile is inclined between the horizontal and the perpendicular.

CARL HERING.

Witnesses:
JOHN HOSKIN,
JOSEPH THOMASSON.